(12) United States Patent
Shadid

(10) Patent No.: US 8,250,671 B2
(45) Date of Patent: Aug. 28, 2012

(54) UTILITY JACKET FOR DOG WALKING

(76) Inventor: Marg Shadid, Wilson, WY (US)

( * ) Notice: Subject to any disclaimer, the term of this patent is extended or adjusted under 35 U.S.C. 154(b) by 816 days.

(21) Appl. No.: 12/185,940

(22) Filed: Aug. 5, 2008

(65) Prior Publication Data

US 2010/0031415 A1 Feb. 11, 2010

(51) Int. Cl.
*A41D 1/00* (2006.01)
(52) U.S. Cl. .............................................. 2/94
(58) Field of Classification Search .................. 2/85, 86,
2/87, 69, 93, 94, 97, 98, 108, 338, 252, 247,
2/248, 249, 250, 251; 119/496, 497, 770,
119/792, 795
See application file for complete search history.

(56) References Cited

U.S. PATENT DOCUMENTS

| | | | | | |
|---|---|---|---|---|---|
| 2,042,282 A | * | 5/1936 | Tworoger | ............................ | 2/247 |
| 2,368,654 A | * | 2/1945 | Frank | ................................. | 2/94 |
| 2,651,039 A | * | 9/1953 | Tonkens et al. | ................... | 2/49.3 |
| 2,709,815 A | * | 6/1955 | Nelson | ............................... | 2/247 |
| 3,332,398 A | * | 7/1967 | Mintz | ............................ | 119/797 |
| 4,475,251 A | * | 10/1984 | Hopkins | ............................. | 2/94 |
| 4,569,089 A | * | 2/1986 | Nesse | ................................ | 2/108 |
| 4,739,809 A | * | 4/1988 | Adams | ............................ | 150/112 |
| 4,977,626 A | * | 12/1990 | Smith | ................................ | 2/250 |
| 5,042,091 A | * | 8/1991 | Tonkens | ............................... | 2/94 |
| D323,733 S | * | 2/1992 | Shalom et al. | .................. | D2/831 |
| 5,247,707 A | * | 9/1993 | Parker et al. | ....................... | 2/102 |
| 5,560,321 A | * | 10/1996 | Hess | ............................... | 119/858 |
| 5,577,653 A | * | 11/1996 | Bieker | ............................. | 224/684 |
| D384,189 S | * | 9/1997 | Tobias | .............................. | D2/828 |
| 5,718,000 A | * | 2/1998 | Ost et al. | ............................... | 2/69 |
| 5,718,189 A | * | 2/1998 | Blake | .............................. | 119/770 |
| D406,412 S | * | 3/1999 | Rubinstein | .................... | D30/153 |
| 5,913,409 A | * | 6/1999 | Test | .................................. | 2/102 |
| 6,016,772 A | * | 1/2000 | Noyes | ............................. | 119/863 |
| 6,240,881 B1 | * | 6/2001 | Edwards et al. | ............... | 119/795 |
| 6,564,388 B1 | * | 5/2003 | Poston | .................................. | 2/86 |
| 6,654,963 B2 | * | 12/2003 | Fayle et al. | .......................... | 2/84 |
| 7,640,895 B2 | * | 1/2010 | Fountoulakis et al. | ........ | 119/795 |
| 7,735,682 B1 | * | 6/2010 | Cassel et al. | ................... | 221/185 |

(Continued)

FOREIGN PATENT DOCUMENTS

AU 2007101121 * 5/2008

*Primary Examiner* — Khoa Huynh
*Assistant Examiner* — Anna Kinsaul
(74) *Attorney, Agent, or Firm* — Peter J. Ims; Westman, Champlin & Kelly, P.A.

(57) ABSTRACT

A jacket that is worn by a person walking a dog includes a main torso covering portion which can be closed to protect and provide warmth to the wearer's torso. A leash that can be utilized as a belt can be used to snuggly fit the jacket around the user's waist. The jacket also includes an exterior pocket that includes a roll of waste bags, typically in a roll. The exterior pocket includes an opening on the front surface of the pocket where a grommet is typically attached around the perimeter of the opening. The bag is pulled through the opening in the grommet to gain access to the bag. The lead bag is removed from the roll along the perforation separating the bags such that the walker can manually remove a bag from the pocket and tear the first bag away from the following bag while leaving the following bag in a position that is easily gripped for the next required cleaning.

23 Claims, 6 Drawing Sheets

U.S. PATENT DOCUMENTS

| | | | |
|---|---|---|---|
| 2002/0084279 A1* | 7/2002 | Lickstein | 221/24 |
| 2004/0199976 A1* | 10/2004 | Hunt | 2/93 |
| 2005/0246823 A1* | 11/2005 | Groom | 2/247 |
| 2007/0017948 A1* | 1/2007 | Smithson | 224/663 |
| 2010/0001016 A1* | 1/2010 | Savage | 221/46 |

* cited by examiner

UTILITY JACKET FOR DOG WALKING

FIELD OF THE INVENTION

The present invention generally relates to a garment worn by a human being. More specifically, the present invention relates to a jacket that can be worn while walking an animal such as a dog throughout the year by its' versatile design for all seasons.

BACKGROUND OF THE INVENTION

Domesticated dogs are the most popular pet in North America. One of the obligations of owning a dog includes ensuring that the dog receives a proper amount of exercise such that the dog remains healthy.

Many people exercise their dogs by taking the dogs on a walk. However, many cities require that a dog be on a leash while in a public area. Therefore, the owner typically must have the dog restrained in a urban or suburban setting.

While walking a dog the owner also is required to clean up any waste that is deposited by the dog. Therefore, the owner must carry a bag to clean up waste. Further, while walking a dog, an owner may want to carry additional supplies or accessories such as keys, a cellular telephone, sunglasses, dog treats, ID, money, tissue or water as well as the waste bags for cleaning up the dog's waste.

Many dog owners try to fit all of these accessories into a single pocket or bag. However, the number of accessories creates clutter, confusion and delay when trying to retrieve a single desired item. Further, this problem is exasperated when the weather is inclement and the owner must wear a jacket which adds bulk to an already cluttered situation.

SUMMARY OF THE INVENTION

The present invention includes a jacket that is worn by a person walking a dog. The jacket includes a main water resistant torso shell covering which can be closed to protect and provide warmth to the wearer's torso. A leash that can be utilized as a belt can be used to snuggly fit the jacket around the user's waist, along with inside elastic cinch cord secured with toggles. The jacket also includes an exterior pocket that includes a roll of waste bags, typically in a roll. The exterior pocket includes an opening on the front surface of the pocket where a grommet is typically attached around the perimeter of the opening. The bag is pulled through the opening in the grommet to gain access to the bag. Therefore, the jacket provides easy access for an individual bag as there is perforation separating the bags such that the walker can manually remove a bag from the pocket and tear the first bag away from the following bag while leaving the following bag in a position that is easily gripped for the next required cleaning.

DETAILED DESCRIPTION OF ILLUSTRATIVE EMBODIMENTS

Figure 1:
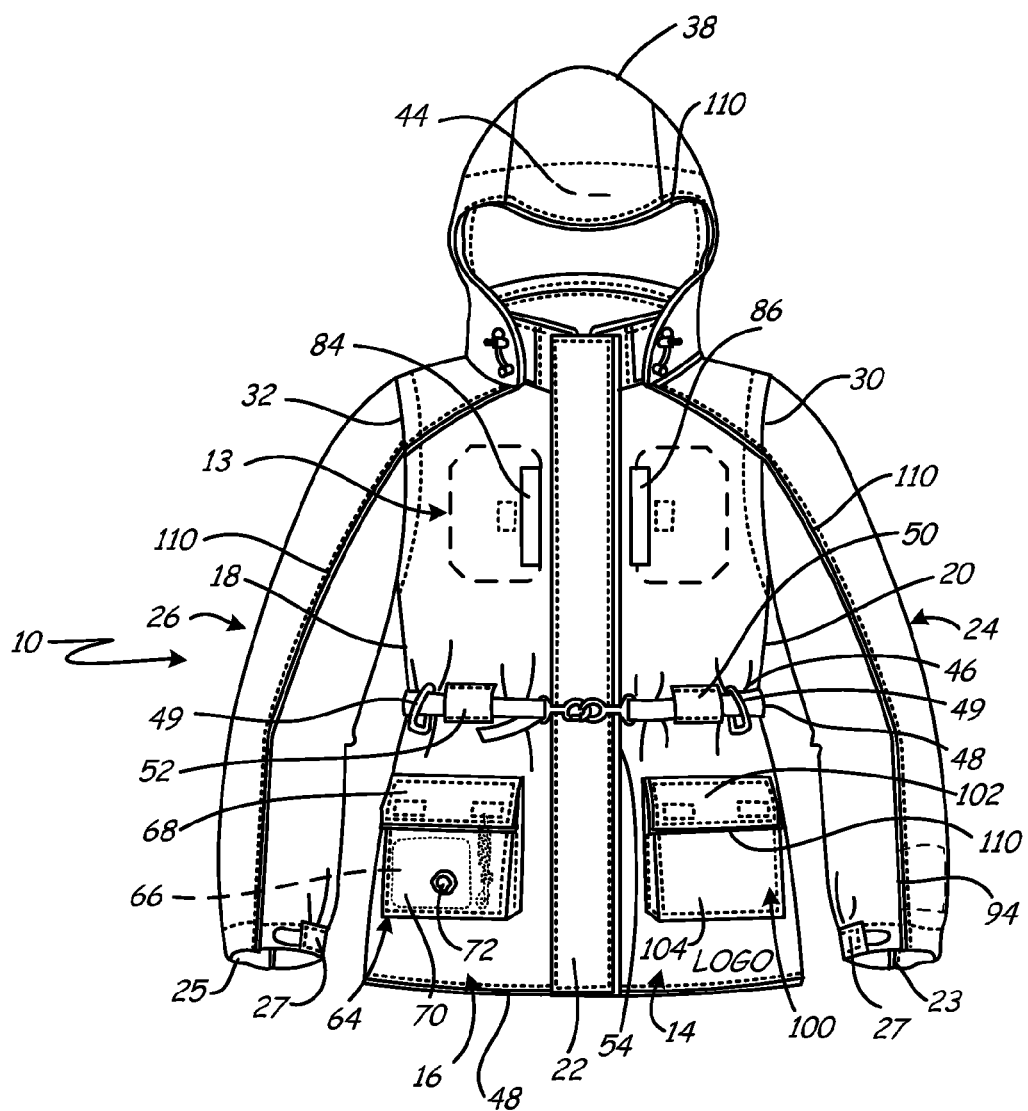
FIG. 1 is a front view of the jacket having a hood extending from the collar.
Figure 2:
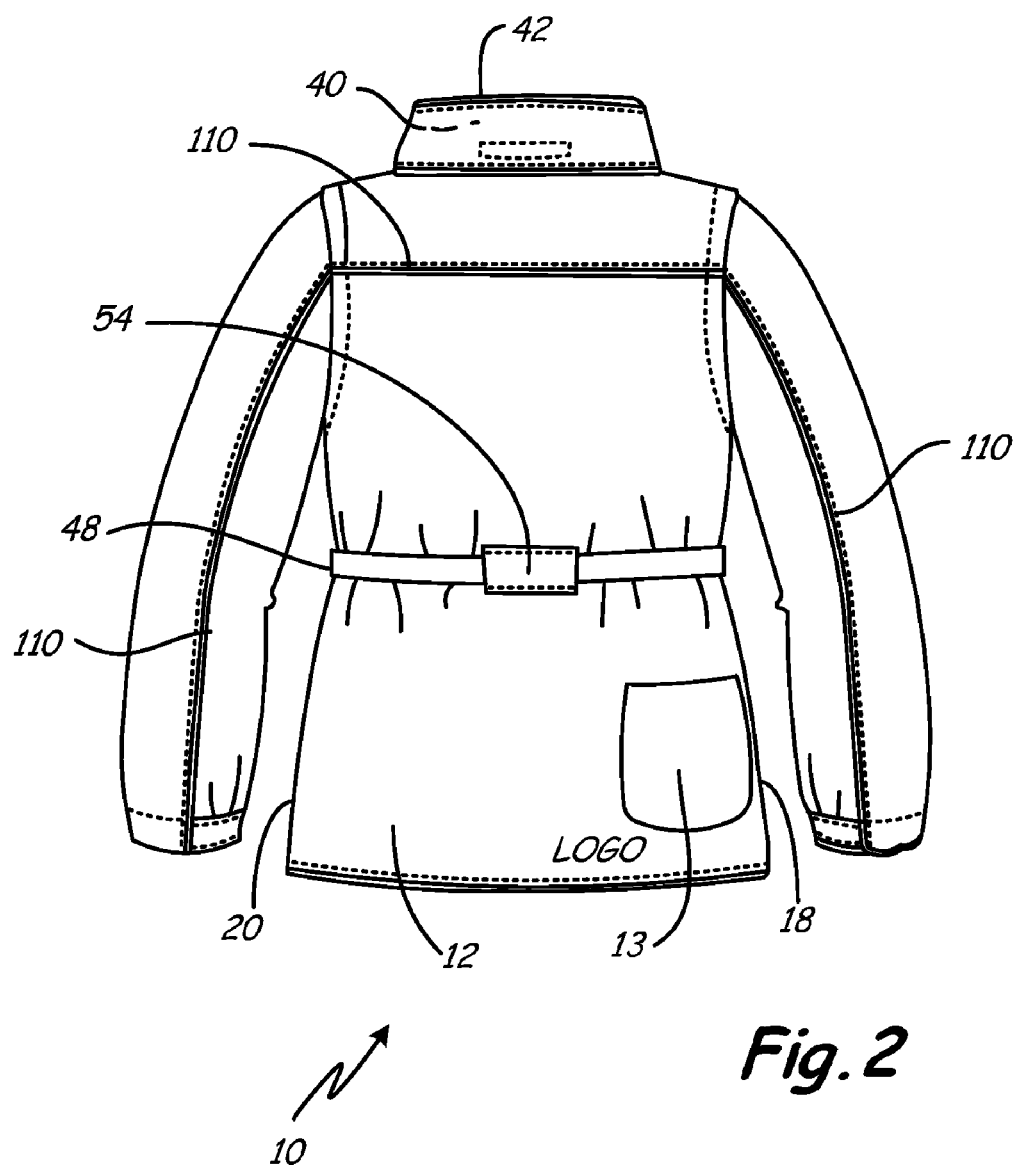
FIG. 2 is a back view of the jacket having the hood positioned within an opening in the collar.

A utility jacket designed for walking a dog is generally depicted in FIG. 1 at 10. Referring to FIGS. 1 and 2, the utility jacket 10 includes a back panel 12, a left front panel 14 and a right front panel 16 that are sewn together at left and right seams 18, 20, respectively. The back panel 12, the left front panel 14 and the right panel 16 form a torso covering portion 13. The free edges of the left and right front panels 14, 16 are joined together with a closure mechanism such as a zipper that is attached to the free edges of the left and right front panels 14, 16. The utility jacket 10 includes a flap 22 that can be secured over the closure mechanism to prevent wind and moisture from penetrating the jacket through the closure mechanism.

The utility jacket 10 includes numerous features which are useful when walking an animal, such as a dog. However, the jacket is also useful as a garment independent of whether a dog is being walked or not.

Figure 3:
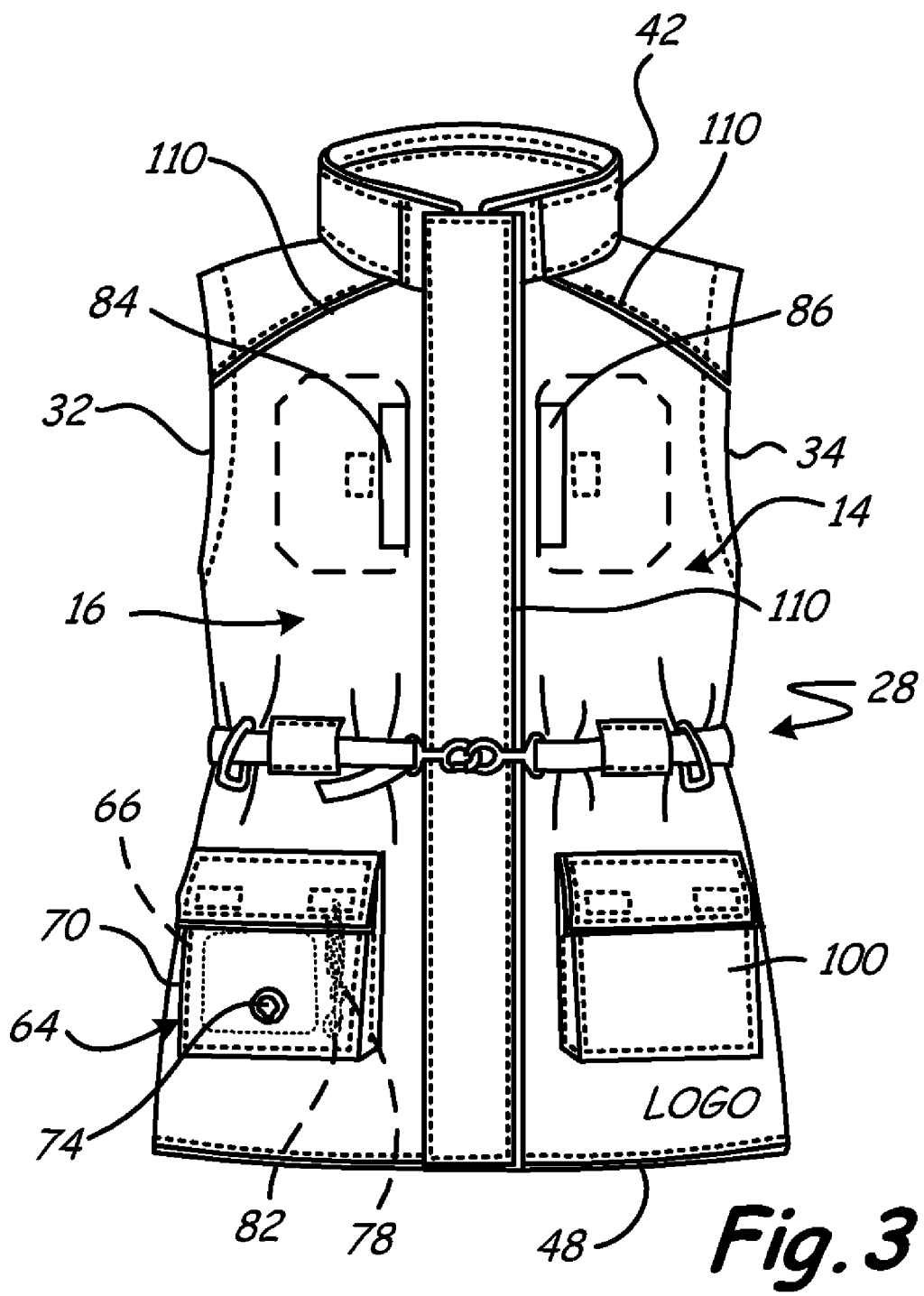
FIG. 3 is a front view of the jacket of the present invention having the inner detachable lining and sleeves removed.

Referring to FIGS. 1-3, utility jacket 10 includes left and right sleeves 24, 26 which are removable secured to the torso covering portion 13 of the utility jacket 10 at the arm holes 30, 32. The torso covering portion 13 of the utility jacket 10 also can be utilized as a vest 28 by removing the sleeves 24, 26 from the left and right arm holes 30, 32 of the vest 28. Typically, a securing mechanism such as a zipper, can be utilized to attach and remove the left and right sleeves 24, 26 from the vest 28. Left and right sleeve zippers are clearly marked "L" and "R" for easy attachment of sleeves when needed.

The utility jacket 10 also includes a hood 38, which can be optionally placed into a pocket 40 in a collar 42 of the utility jacket 10 or raised above the head to protect the head from weather or cold. The hood 38 typically includes a stiff visor 44 that is constructed of a suitably rigid polymeric material that is sewn between two layers of the hood 38. The visor 44 provides protection to the user's face and eyes when the hood is positioned over the wearer's head. The hood 38 includes elastic cinch cord, secured with toggles to tighten hood snuggly around face to protect from wind or inclement weather.

The utility jacket 10 includes an elastic cord waistband 46 secured with adjustable cinch toggles secured to an inner surface of the utility jacket 10. The toggles secure the utility jacket 10 to the waist of the wearer such that wind or cold weather cannot easily penetrate upward from a bottom opening 48 of the utility jacket 10 which would chill the walker's torso. Alternatively, the toggles can be loosened to eliminate the waist line of the utility jacket 10.

Additionally, the jacket includes a belt 48 that is secured to the utility jacket 10 with loops 50, 52, 54 attached to the utility jacket 10. Belt loops 50, 52 are attached to the left and right front panels 14, 16, respectively. The utility jacket 10 also includes a loop 54 attached to the back panel 12. The belt is positioned through the loops 50, 52, 54 to provide a tighter fit around the waist as well as to provide a convenient storage place for the leash 48 on the jacket. Two (2) carbiners 49 can also be attached to the belt 48 or belt loops, 50 and 52 to provide clips for carrying additional equipment or allowing momentary dog leash attachment for hands free movement when cleaning up after the dog.

Figure 5:
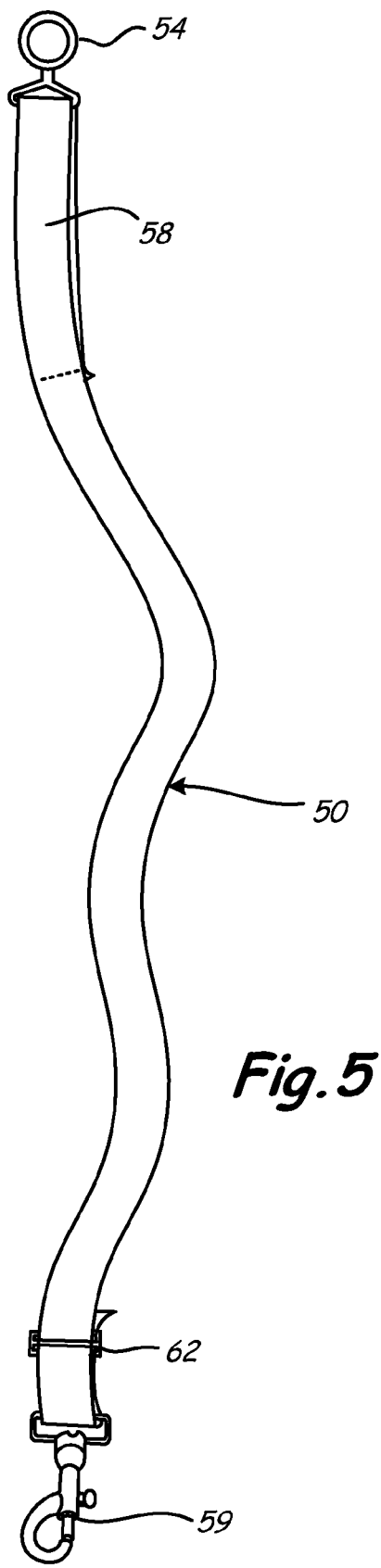
FIG. 5 is a perspective view of a belt that can be utilized as a leash.

Referring to FIG. 5, the belt 48 can be utilized as a leash when removed from the utility jacket 10. The leash 48 includes a metal D-ring 54 attached to a proximal end 56 where the proximal end 56 includes a loop 58 for inserting the user's hand or for gripping the leash 48. A metal clip ring 59 is attached to the distal end 60 of the leash or belt 48 where the metal clip ring 59 also includes a swivel and a spring loaded latch for securing to either the metal D-ring 54 or a dog collar (not shown). The length of the belt or leash 48 is adjustable with an adjustment buckle 62 which can either lengthen or shorten the length of the leash 48. The belt buckle 62 allows adjustment in creating an open loop applied around the dog's neck in the event the dog walker comes upon a lost or lose dog without a collar. This mechanism is similar to that as leashes used at veterinarian offices.

The right front panel 16 includes a right cargo pocket 64 that is designed to contain a roll of plastic bags 66, which are typically biodegradable. Typically, the roll of bags 66 is positioned within the right cargo pocket 64 by lifting a top flap 68, which is typically secured to the front panel 70 of the cargo pocket 64 with a securing mechanism, such as a hook and loop closure mechanism which is sold under the VELCRO®. With the roll of bags 66 positioned within the pocket 64, a lead bag is positioned through an opening 72 in the front panel 70 of the pocket 64. A perimeter of the opening 72 is typically reinforced with a grommet 74 which aids in removing the lead bag from the roll and prevents wear on the front panel as the bags are removed. The lead bag is detached from the roll along the perforated seam between the lead bag to the next bag in the roll 66. As the lead bag is removed from the pocket 64 the next bag is then in position to be easily gripped and removed from the pocket 64 with manual force. The process is continued until the roll 66 is depleted over time. When the roll is depleted, a new roll of bags 66 is then put into the pocket 64 and the process is continued. Therefore, the present utility jacket 10 provides a convenient place for storing and dispensing dog waste bags.

Sewn into a seam of the right cargo pocket 64 is an elastic coil 78. A proximal end is sewn into the seam in the pocket 64 such that the end is secured in a fixed place and therefore, the elastic coil 78 is fixedly attached to the utility jacket 10. A clip 82 is attached to a distal end of the elastic coil 78, which is designed to secure a commonly needed accessory when taking a dog for a walk. One such accessory is a key chain which can be secured to the clip 82. By securing the key chain to the clip 82, the wearer knows where the keys are and can easily and quickly gain access to the keys by opening the top flap 66 of the pocket 64 and gripping the keys and stretching the elastic coil 78.

The left front panel 14 and the right front panel 16 also includes a top pockets 86, 84 that are secured with a hook and loop closure 84. The top pockets 86, 84 can be utilized to store any of the numerous required accessories when walking a dog such as money, credit cards, sunglasses, ID, cell telephone. The top pockets 86, 84 are designed for easy side slide hand movement for wearer to access needed material, pockets are secured closed with the hook and loop closure.

Figure 6:
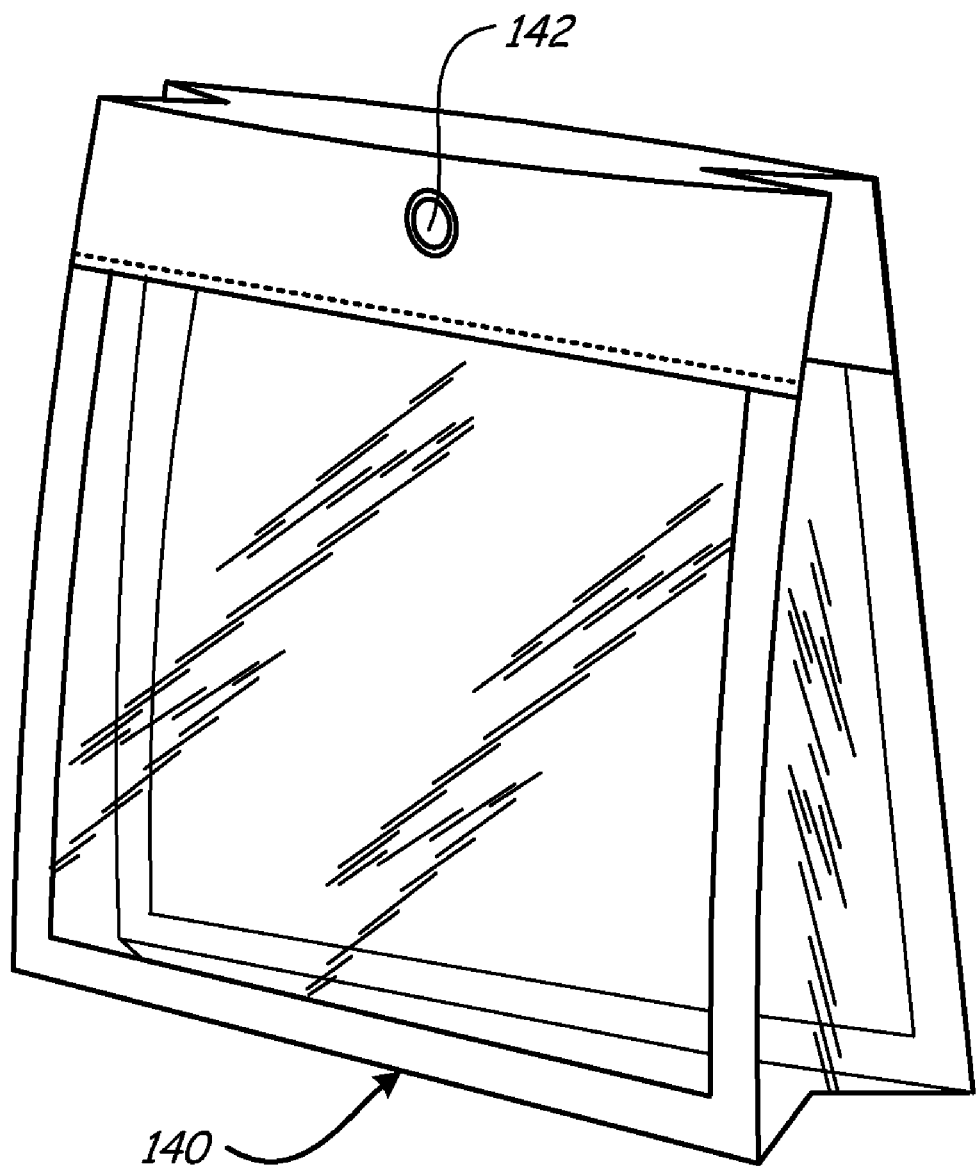
FIG. 6 is a front view of a pouch that is positioned within a cargo pocket.

The left breast panel 14 also includes a cargo pocket 100 which can be utilized to store bulky accessories such as dog toys or treats while going for a walk. The cargo pocket 100 includes a flap 102 which is also secured to a front panel 104 of the pocket 100 with a closure mechanism, such as a hook and loop closure. The left cargo pocket 100 also includes a detachable/removable water proof pouch 140 as best illustrated in FIG. 6, such that a dog bag containing waste can be stored in the pocket 100 without damaging the utility jacket 10. Also, the left cargo pocket 140 is removably attached to the cargo pocket with snaps such that the walker can detach the pouch 140 from the pocket and carry the contents of the pouch 140 away from the utility jacket 10.

Referring back to FIGS. 1 and 3, back panels of the right cargo pocket 64 and the left cargo pocket 100 are sewn to the front panels 16 and 14 around the top edge, the bottom edge and the edge closest to the free end of the front panels 14 and 16 to provide pockets which are positioned behind the cargo pockets 64, 100. The pockets are conveniently used to warm hands by putting the hand through the opening in the side between the left and right front panels 14, 16 and the back panels of the cargo pockets 64, 100.

Referring to FIG. 2, the back panel 12 of the utility jacket 10 includes a mesh pocket 13 for storing accessories which contain liquids or may potentially be wet. One such accessory is a water bottle. By having a separate water bottle pocket 13, the user is not required to hold the water bottle while walking. Typically, a water bottle can become cumbersome if the bottle is carried in the walker's hand during an entire walk. Also, depending upon the ambient temperature, the water bottle may make the walker's hands cold. By positioning the water bottle in the pocket 13 on the exterior surface on the back panel 12, the user can selectively grip the bottle for a drink and then replace the water bottle back in the back pocket 13.

Referring to FIGS. 1-3, the utility jacket 10 also includes reflective piping 110 along each of the seams, the jacket logos on front left panel 16 and on back panel 12 are also reflective. By including reflective piping 110 along the seams, the walker becomes visible to oncoming traffic at low light, such as dawn, dusk or night time. Also, the covering of the utility jacket 10, or shell, is water and wind resistant utilizing ripstop fabric.

Cuffs 23, 25 of the sleeves 24, 26 respectively, also include an elastic band positioned around the circumferences of the cuffs 23, 25, which helps to secure the cuffs 23, 25 to the arm and prevent the cuffs 23, 25 from rising up on the walker's arm during use. Additionally, the cuffs 23, 25 also includes a tightening mechanism which includes a tab 27 which can be secured to the cuffs 23, 25 to provide the desired tightness for each of the cuffs 23, 25 around the wrists. Preferably the tightening mechanism includes a tab 27 having one of a hook or loop portion of a securing mechanism and the end including the other portion of a hook and loop closure. Left sleeve 24 also supplies wearer with an additional pocket 94 along a seam proximate the cuff. The pocket 94 is closed with a zipper to provide a secured closure. The pocket 94 provides a convenient storage area for needed tissue, or other accessories, without digging through deeper pockets.

Inside each right and left front panels, 14, 16 are additional mesh pockets sewn on the upper torso area of inside panels. These additional pockets allow for ample supply storage.

Figure 4:
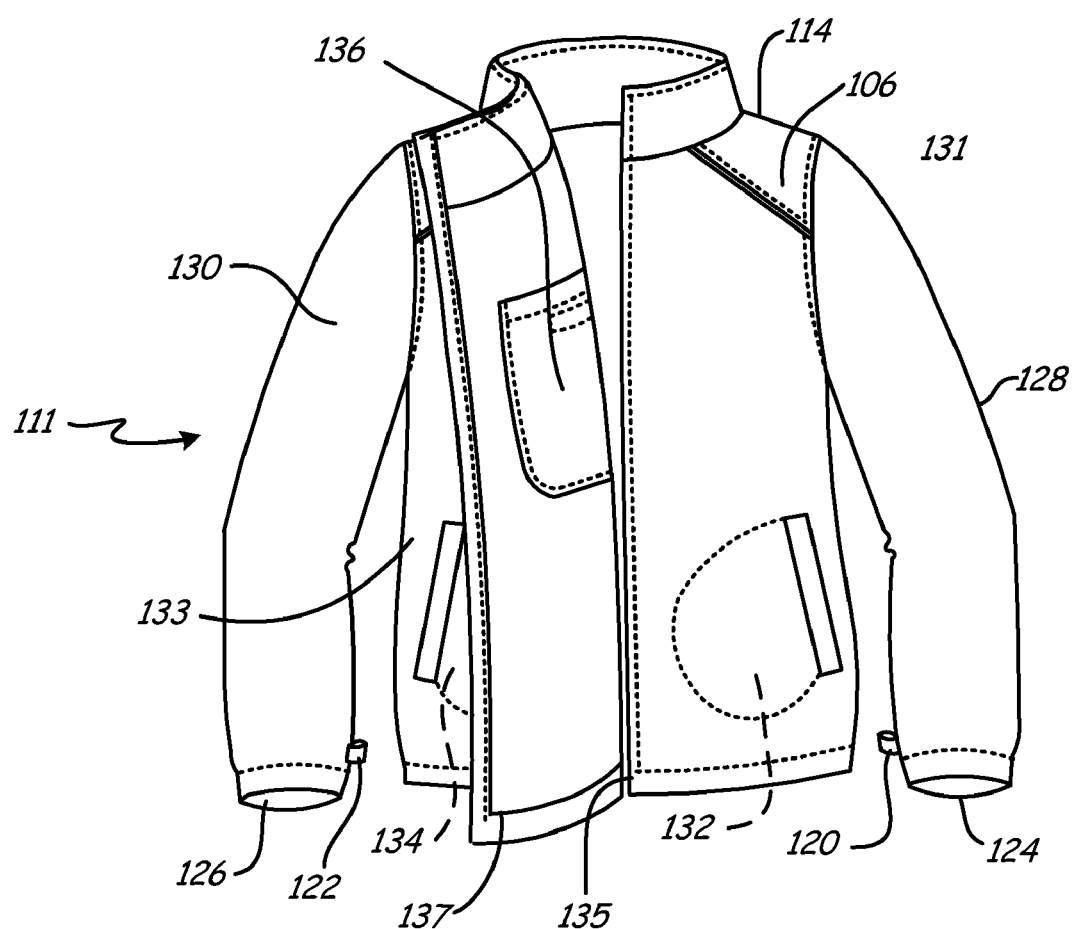
FIG. 4 is a front view of the liner for the jacket.

Referring to FIG. 4, the utility jacket 10 also includes a removable liner 111. The liner 111 is typically made out of a fleece-like material that includes a similar water and wind resistant fabric 106 as the jacket shell fabric on the front of the shoulders, the yoke of the back, as well as the collar. The shell liner material provides weather proofing such as water and wind resistance and durability on the high wear area and also prevents the top portion of the walker's torso from getting wet in the event of walking the dog in inclement weather.

The liner 111 includes a fabric loop which is secured between the seam between collar and back panel where the loop is typically made of either a hook or a loop component of a hook and loop fastener in the interior surface. The utility jacket 10 includes the mating surface which secures the back portion of the liner 111 to the utility jacket 10. The liner 111 also includes loops 120, 122 at the wrist ends 124, 126 of the sleeves 128, 130 which are secured with a fastening device, such as a snap, to the inside surfaces of the sleeves 24, 26 of the utility jacket 10. The liner right and left panels have separate side zippers 135, 137 that can easily be attached to the inside front panels 14, 16 with zippers. By securing the back panel 114 at the top and at the wrist ends 120, 122 of the sleeves 124, 126 and with the zippers 135, 137 along the free ends of the left and right front panels 131, 133, respectively, to the utility jacket 10, the liner 111 can be easily attached to or removed from the utility jacket 10 depending upon the weather. The liner 111 also includes front outer pockets 132, 134 sewn to the front left and right breast panels for positioning the user's hands within the pockets 132, 134. Also, the liner 111 includes pockets 136 which are attached to the interior surfaces of the front left and right breast panels which can be utilized to carry accessories when going for a walk.

Therefore, the present utility jacket 10 provides for at least four configurations for walking a dog. First, the dog walker can utilize the fleece liner 111 alone. Secondly, the user can utilize the utility jacket 10 in combination with the liner 111. Thirdly the user can utilize the jacket without liner however with sleeves as a light weight shell for mildly cool weather. Finally, the use can remove both the liner 111 and the sleeves 24, 26 to utilize the utility jacket 10 as a vest.

As such, the present invention provides a convenient and useful device for walking a dog in any type of weather and also provides the necessary storage capabilities such that a dog walker can carry the necessary accessories needed for walking a dog in and orderly and non-confusing fashion. The present utility jacket if supplied with waste bags, extra home key, extra pair of sunglasses, ID card and spare money will allow the wearer only to bring cell telephone as an addition so that the preparation for walking a dog can be minimized.

Although the present invention has been described with reference to preferred embodiments, workers skilled in the art will recognize that changes may be made in form and detail without departing from the spirit and scope of the invention.

What is claimed is:

1. A jacket comprising:
   a torso covering portion comprising left and right arm holes;
   a right sleeve attached to the torso covering portion and aligned with the right arm hole;
   a left sleeve attached to the torso covering portion and aligned with the left arm hole; and
   a first pocket comprising a front panel having a top edge, a bottom edge, a left edge and a right edge wherein the front panel is attached to the torso covering portion proximate the bottom edge, the right edge and the left edge, wherein an entrance to the first pocket is between the top edge and the torso covering portion;
   the first pocket being adapted to retain a roll of plastic bags, the first pocket having an opening in the front panel for dispensing the bags with manual force while gripping a lead bag; and
   a metal grommet secured to the front panel around a perimeter of the opening.

2. The jacket of claim 1 and wherein the metal grommet is circular in configuration.

3. The jacket of claim 1 and wherein the torso covering portion comprises a back panel, a left front panel and a right front panel wherein the left front panel and the right front panel have left and right free edges that are joined with a securing mechanism.

4. The jacket of claim 3 and further comprising a mesh pocket attached to the back panel.

5. The jacket of claim 1 and further comprising a belt, wherein the belt is slidably attached to the jacket and wherein the belt also is capable of functioning as a leash.

6. The jacket of claim 5 and wherein the belt comprises:
   a strap having a first end and a second end;
   a loop proximate the first end;
   a ring attached to the loop; and
   a swivel clip attached to the second end wherein the swivel clip can be attached to the ring to function as a belt or the swivel clip can be attached to a collar to function as a leash.

7. The jacket of claim 1 and further comprising reflective material attached to the jacket.

8. The jacket of claim 1 and further comprising third and fourth upper pockets having vertical openings.

9. The jacket of claim 1 and further comprising:
   a collar attached to the torso covering portion and having a collar pocket; and
   a hood having a rigid visor secured therein wherein the hood is positionable within the collar pocket.

10. The jacket of claim 1 and further comprising a water resistant shell covering the torso covering portion, the left sleeve and the right sleeve.

11. The jacket of claim 1 and further comprising a liner secured to the torso covering portion, the left sleeve and the right sleeve and wherein the liner is removable therefrom.

12. A jacket comprising:
   a torso covering portion comprising left and right arm holes and a first pocket comprising a front panel secured thereto and having an entrance to the first pocket and an aperture in the front panel wherein the aperture is configured to dispense a bag from a roll of bags when positioned in the first pocket and wherein the first pocket further comprises a metal grommet attached to the front panel around a perimeter of the aperture;
   a right sleeve attached to the torso covering portion and aligned with the right arm hole;
   a left sleeve attached to the torso covering portion and aligned with the left arm hole; and
   a belt having a first end and a second end, the belt comprising a loop at a first end wherein a portion of the belt can be positioned through the loop to form a securing loop, wherein the securing loop is capable of be positioned around a neck of a dog and the circumference of the loop is capable of being adjusted to snugly fit around the neck of the dog and wherein a clip is attached to the second end of the belt for attaching to a collar and wherein the belt further comprises an adjusting mechanism for adjusting the distance between the loop and the clip and wherein the belt is slidably attached to the jacket.

13. The jacket of claim 12 and wherein the belt comprises:
   a ring attached to the loop; and
   a wherein the clip comprises a swivel clip attached to the second end Wherein the swivel clip can be attached to the ring to function as a belt or the swivel clip can be attached to a collar to function as a leash.

14. The jacket of claim 12 and wherein the torso covering portion comprises a back panel, a left front panel and a right front panel wherein the left front panel and the right front panel have left and right free edges that are joined with a securing mechanism.

15. The jacket of claim 14 and further comprising a mesh pocket attached to the back panel.

16. The jacket of claim 12 and further comprising reflective material attached to the jacket.

17. The jacket of claim 12 and further comprising third and fourth upper pockets for carrying a pair of sunglasses and a cellular telephone.

18. The jacket of claim 12 and further comprising:
a collar attached to the torso covering portion and having a collar pocket; and
a hood having a rigid visor secured therein wherein the hood is positionable within the collar pocket.

19. The jacket of claim 12 and further comprising a water resistant shell covering the torso covering portion, the left sleeve and the right sleeve.

20. The jacket of claim 12 and further comprising a liner secured to the torso covering portion, the left sleeve and the right sleeve and wherein the liner is removable therefrom.

21. The jacket of claim 1 and further comprising:
a second pocket attached to the torso covering portion; and
a water proof pocket liner wherein the liner is configured to be removably positionable within the second pocket.

22. The jacket of claim 12 and further comprising:
a second pocket attached to the torso covering portion; and
a water proof pocket liner wherein the liner is configured to be removably positionable within the second pocket.

23. A jacket comprising:
a torso covering portion comprising left and right arm holes;
a right sleeve attached to the torso covering portion and aligned with the right arm hole;
a left sleeve attached to the torso covering portion and aligned with the left arm hole;
a first pocket comprising a first front panel wherein the first front panel is attached to the torso covering portion, wherein the first pocket includes an entrance to the pocket and is configured to retain a roll of plastic bags, the pocket having an opening through the first front panel for dispensing the bags with manual force while gripping a lead bag;
a metal grommet secured to the first front panel about a perimeter of the opening;
a second pocket comprising a second front panel wherein the second front panel is attached to the torso covering portion a distance from the first front panel and having an entrance to the second pocket; and
a waterproof pocket liner wherein the liner is configured to be removably positionable within the second pocket through the entrance.

\* \* \* \* \*